United States Patent

Phelps

[15] 3,675,907
[45] July 11, 1972

[54] CARBURETOR

[72] Inventor: Harold E. Phelps, Plymouth, Mich.

[73] Assignee: Harold Phelps, Inc., Plymouth, Mich.

[22] Filed: May 16, 1968

[21] Appl. No.: 729,611

Related U.S. Application Data

[63] Continuation-in-part of Ser. No. 636,356, May 5, 1967, abandoned.

[52] U.S. Cl..................................261/39, 261/51, 261/68, 261/70
[51] Int. Cl.....................F02m 1/04, F02m 3/00, F02m 7/22
[58] Field of Search..................261/60, 46, 49, 51, 67, 64 R, 261/39 B, 68, 70; 123/122, 39 A, 119

[56] References Cited

UNITED STATES PATENTS

| 2,061,494 | 11/1936 | Weber | 261/46 |
|---|---|---|---|
| 2,679,835 | 6/1954 | Thorner | 123/122 |
| 2,682,392 | 6/1954 | Richardson | 261/49 |
| 1,958,690 | 5/1934 | Ball et al. | 261/51 X |
| 3,339,900 | 9/1967 | Rugeris | 261/67 X |
| 3,432,152 | 3/1969 | Sweeney | 261/51 X |
| 2,630,304 | 3/1953 | Rivoche | 261/69 X |
| 3,455,283 | 7/1969 | Phelps et al. | 123/119 A |
| 3,485,483 | 12/1969 | Pohlman | 261/39.2 |
| 954,785 | 4/1910 | Graven | 261/41 |
| 2,136,353 | 11/1938 | Weber | 261/39.2 UX |

FOREIGN PATENTS OR APPLICATIONS

| 157,561 | 1/1921 | Great Britain | 261/49 |
|---|---|---|---|
| 216,500 | 12/1941 | Switzerland | 261/51 |

Primary Examiner—Ronald R. Weaver
Attorney—Fisher & Schmidt

[57] ABSTRACT

A carburetor for internal combustion engines. Precise regulation of combustion fuel is achieved by means of a high precision metering valve coupled to and operable with the conventional butterfly valve in a manner such that the amount of raw fuel is accurately regulated in accordance with the demand. The metering valve further incorporates a cold start enrichment mechanism and a second metering valve is provided to compensate for abnormal load demands and to prevent overcharging of the engine. The carburetor includes a housing having a throat and a throttle controlled butterfly valve in the throat at the outlet thereof. A fuel nozzle introduces fuel into the throat. An inlet on the housing for receiving fuel from a fuel supply and a first metering valve in the housing for controlling the flow of fuel from the fuel inlet to the nozzle. The first valve comprising a valve seat member having a bore therethrough defining a fuel passage. A valve member mounted for axial reciprocation within the passage. The valve member has a shoulder thereon engageable with the seat at the inlet end of the fuel passage to block the fuel passage. An elongate tapered pin projects axially from the shoulder through the passage. The area of the fuel passage available to the flow of fuel when the shoulder is disengaged from the seat is variable in accordance with the axial position of the pin relative to the fuel passage. The valve member is coupled to the butterfly valve for positioning the pin axially within the fuel passage in accordance with the position with the butterfly valve. A linkage independent of the butterfly valve establishes the axial position of the pin relative to the fuel passage. A vertically elongate inlet chamber formed in the housing. First outlet passage in the housing for conducting fuel from the lower portion of the inlet chamber to the first metering valve. A float chamber defined in the housing. Second outlet passage in the housing for conducting fuel from the upper portion of the inlet chamber to the float chamber. A third passage in the housing for conducting fuel from the lower portion of the float chamber to the throat at a location at the outlet side of the butterfly valve.

1 Claim, 7 Drawing Figures

PATENTED JUL 11 1972 3,675,907
SHEET 1 OF 4

INVENTOR.
HAROLD E. PHELPS.
BY
SETTLE, BATCHELDER & OLTMAN
ATT'YS.

INVENTOR.
HAROLD E. PHELPS.
BY
SETTLE, BATCHELDER & OLTMAN.
ATT'YS.

INVENTOR.
HAROLD E. PHELPS.
BY
SETTLE, BATCHELDER & OLTMAN.
ATT'YS.

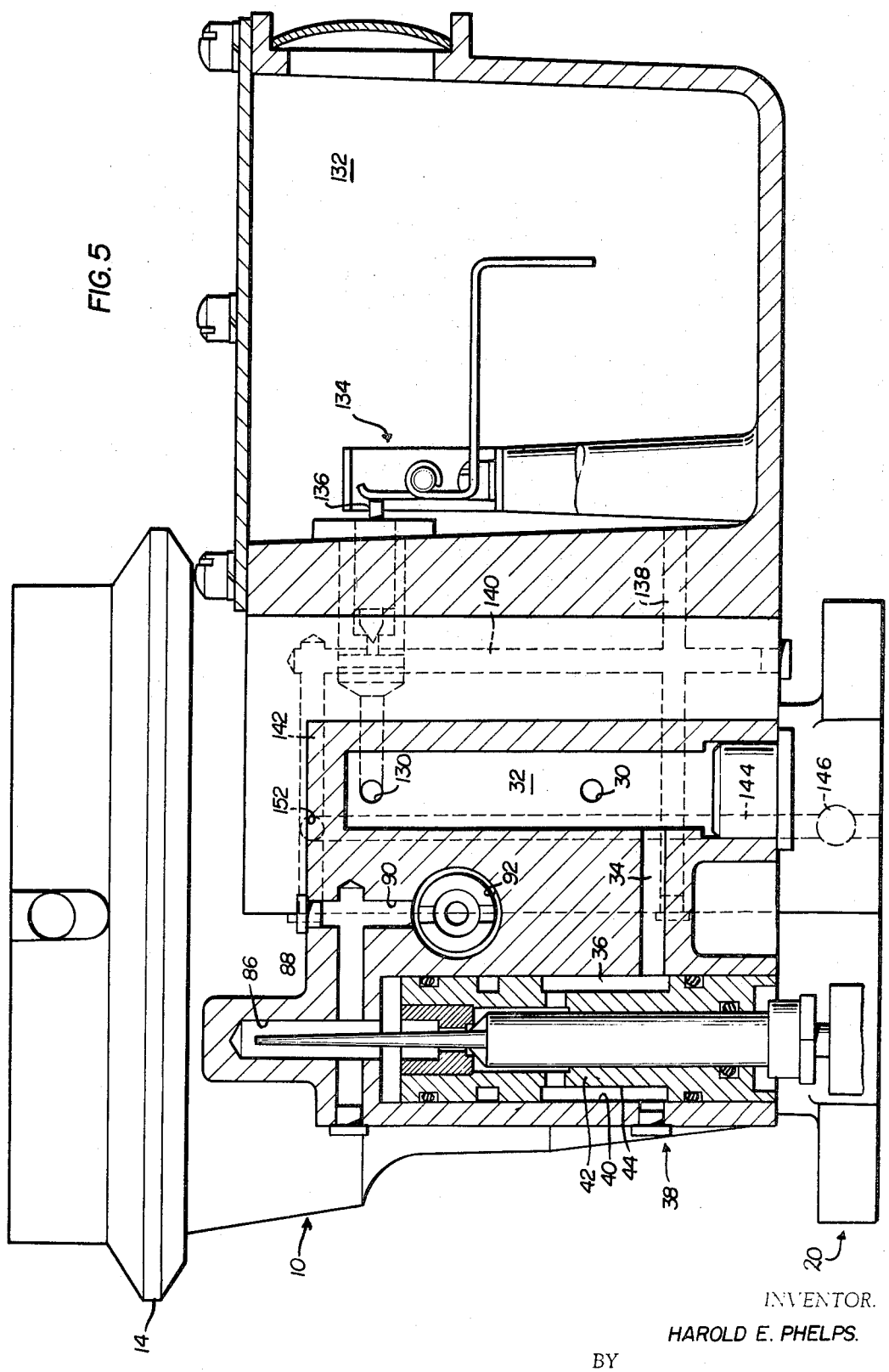

CARBURETOR

This application is a continuation-in-part of my co-pending application Ser. No. 636,356, filed May 5, 1967 and now abandoned.

The present invention is especially directed to the achievement of improved operating characteristics for a carburetor adaptable for use with internal combustion engines in the automotive field. The design is such that the invention is readily adaptable for use in single, dual and four-barrel carburetors. The invention is especially directed toward the provision of a carburetor in which an adequate supply of fuel is assured for all operating conditions in a manner such that excess supply of fuel is minimized, thereby achieving substantially complete combustion with the consequent minimization of undesirable fume emission.

To this end, a carburetor embodying the present invention employs a conventional butterfly valve combined with two metering valves connected in series between the fuel supply and the mixing chamber of the carburetor. One of the two metering valves is mechanically coupled to the butterfly valve so that the metering valve opening and the butterfly valve opening increase and decrease together thereby providing a supply of liquid fuel which varies in accordance with the performance demand. The second metering valve is normally maintained at a fixed opening, but is controlled by the engine vacuum to provide for an increased opening under abnormally high load conditions.

Further objects, features and advantages of the invention will become apparent by reference to the following specification read in connection with the accompanying drawings.

In The Drawings:

FIG. 5 is a cross-sectional view taken on line 5—5 of FIG. 2;

Figure 1:
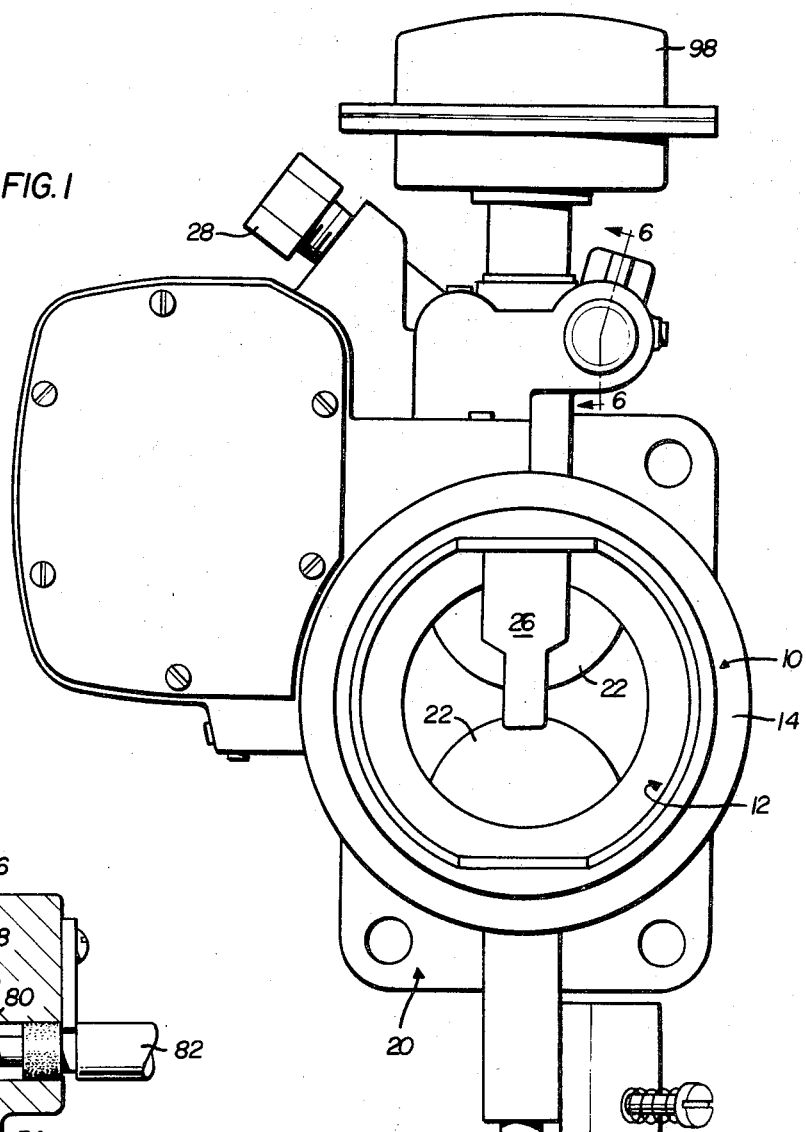
FIG. 1 is a top plan view of a carburetor embodying the present invention.

As shown in the drawings, one form of carburetor embodying the present invention includes a main body casting or housing designated generally 10 which is formed with a vertically extending main passage or throat 12. A flange 14 at the upper end of the casting provides a mounting support for a conventional air cleaner, not shown, from which filtered air is passed into the upper or intake end of throat 12. A reduced diameter section 16 in the throat defines a venturi section, while the lower end of the throat is in communication with two main outlet passages 18 formed in a butterfly valve housing 20 fixedly mounted by suitable means, not shown, on the lower end of main body casting 10. While the particular carburetor shown is a dual or two-barrel carburetor having two outlet passages 18, it will be apparent from the following description that the present invention is equally applicable to single-barrel carburetors and, with duplication of certain parts, to four-barrel carburetors as well.

Flow of the gaseous fuel mixture through outlet passages 18 is controlled by butterfly valve assemblies of conventional construction each including a circular valve member 22 mounted upon a common shaft 24 rotatably journaled in the butterfly valve housing. Fuel is injected into throat 12 for mixture with the air flowing downwardly through the throat by a fuel nozzle 26 which projects into the central portion of the reduced diameter section 16 of the throat.

Figure 3:
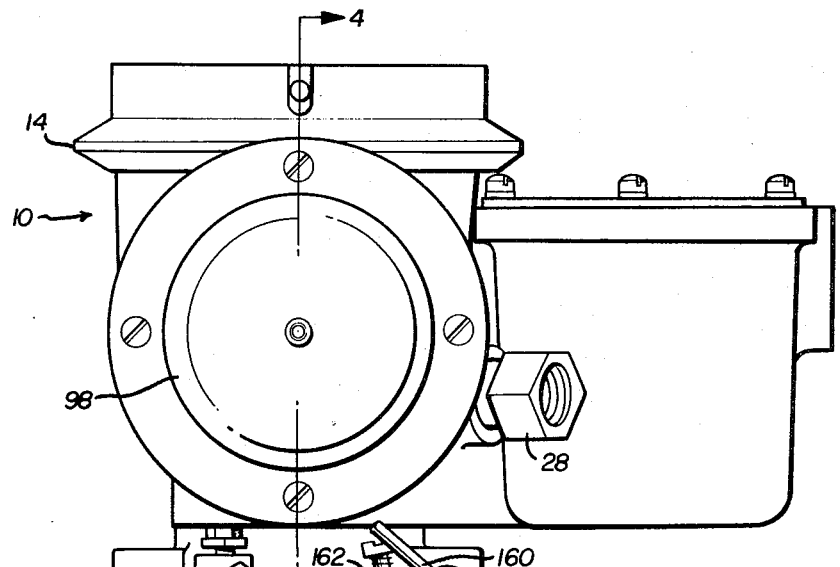
FIG. 3 is a side elevational view of the carburetor of FIG. 1.

Fuel is supplied to the carburetor from a conventional fuel pump which is connected by a suitable conduit to a fuel inlet fitting 28 (FIG. 3). An internal passage 30 (FIG. 5) conducts fuel from fitting 28 into a fuel inlet chamber 32 defined by a plugged bore within the body 10. Fuel, in liquid form, is conducted from inlet chamber 32 via a passage 34 (FIG. 5) which connects inlet chamber 32 to the inlet port 36 of a main fuel metering valve assembly designated generally 38.

Figure 7:
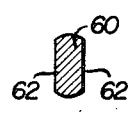
FIG. 7 is a detail cross-sectional view taken on line 7—7 of FIG. 6.

Metering valve 38 includes a valve chamber 40 defined by a bore in main body 10, within which a valve body 42 is slidably mounted, the body 42 being sealed to the wall of bore 40 as by suitably located 0 rings. Valve body 42 is formed with a reduced diameter portion 44 which cooperates with the wall of bore 40 to define a chamber 45 which is in communication with inlet port 36 and passage 34. A central bore 46 is formed in valve body 42 to slidably receive a valve stem 48. At its upper end, bore 46 is enlarged as at 50 to define a chamber 52 surrounding the upper end of valve stem 48, which chamber is in communication with chamber 45 via a plurality of radially extending ports 54. The upper end of bore 46 receives a valve seat defining plug 56 which has an accurately dimensioned passage 58 therethrough. A tapered valve needle 60 is fixedly secured to the upper end of valve stem 48 to project from the stem through passage 58. As best seen in FIG. 7, needle 60 is constructed from a conical rod having tapered flat portions 62 ground or filed on one or more sides.

The metering function of main fuel metering valve 38 is performed by axially shifting valve needle 60 relative to passage 58, the tapered cross section of the needle thus varying the area of passage 58 available for the flow of fuel. It has been found that the necessary dimensional precision of the tapered valve needle 60 is much more easily achieved by employing the flattened side portions in preference to the normal circular cross-sectional configuration.

The upper end of valve stem 48, at its juncture with the lower end of valve needle 60, forms a shoulder 64 which is engageable with the valve seat defined at the lower end of passage 58. Preferably, a resilient gasket such as 66 is mounted upon the shoulder to provide an adequate seal.

Valve stem 48 and the attached needle 60 are vertically reciprocated relative to the carburetor body 10 by a linkage which is mounted upon and driven by shaft 24 of the main butterfly valve. A crank arm 68 is fixedly mounted upon shaft 24 and a roller 70 is rotatably mounted on the outer end of crank arm 68. Roller 70 is received within a horizontal slot 72 formed in a follower 74 which is fixedly secured as by an adjustable threaded lock nut assembly 76 to the lower end of valve stem 48.

It is believed apparent that the coupling of valve stem 48 and needle 60 to the butterfly valve operating shaft 24 in the manner described above mechanically coordinates the positioning of the butterfly valves with the position of valve needle 60 within passage 58 of the metering valve. The relationship is such that the degree of opening of the butterfly valves and metering valves increases and decreases together. Thus, for a given opening of the butterfly valves, a corresponding opening is achieved through the metering valve, so that an accurately regulated supply of fuel is achieved.

Figure 6:
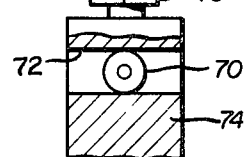
FIG. 6 is a detail cross0-sectional view taken on line 6—6 of FIG. 1.
Figure 2:
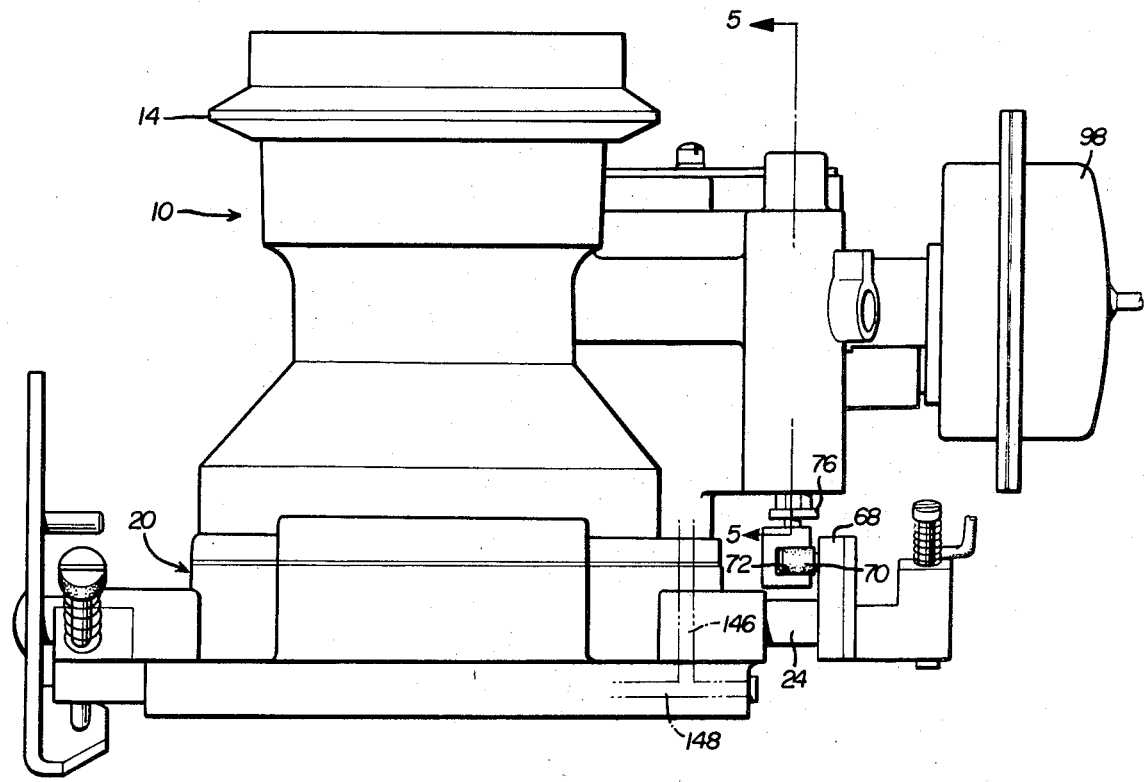
FIG. 2 is a front elevational view of the carburetor of FIG. 1.

Valve body 42 of the metering valve is normally stationary and held in the position shown in FIGS. 6 and 7. However, this position is employed during normal operating conditions of the attached engine, i.e., when the engine is warm and the fuel-air mixtures controlled by metering valve 38 for normal operation are too lean for efficient cold starting of the engine. To provide for cold starting enrichment, valve body 42, as stated above, is mounted within bore 40 for sliding movement and may be axially moved to selected positions of adjustment by means of a pin 80 eccentrically mounted to a shaft 82 rotatably journaled within body 10, pin 80 being received within an annular groove 84 formed in valve body 42. Shaft 82 may be rotatably positioned by either a manually controlled linkage or by a suitable thermostatically operated device responsive to engine temperature.

Figure 4:
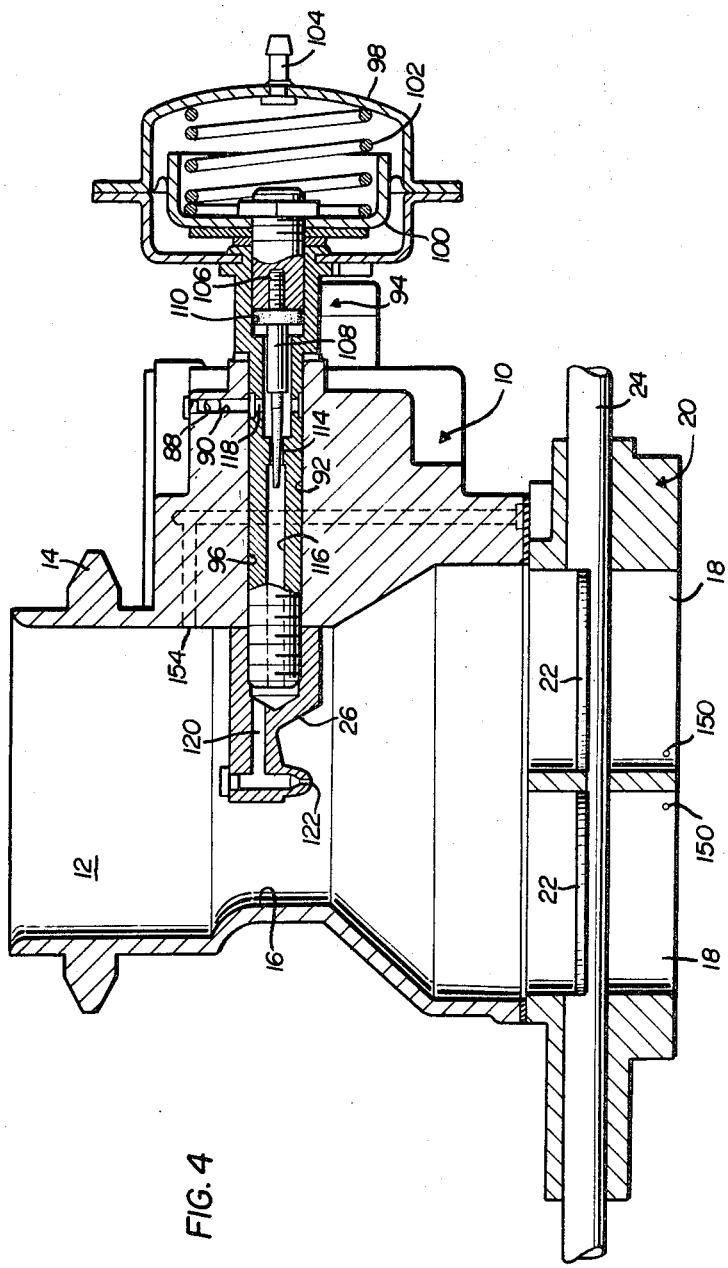
FIG. 4 is a detail cross-sectional view of the carburetor taken on line 4—4 of FIG. 3.

Fuel which passes upwardly through passage 58 enters a chamber 86 defined by an extension of bore 40 and passes from chamber 86 into a cross passage 88 leading into another passage 90 which communicates with an enlarged bore 92 in carburetor body 10 (see FIG. 4). A fuel restrictor valve or second metering valve assembly 94 is mounted in bore 92 and includes a stationary valve body 96 mounted within the bore. Body 96 projects outwardly from main carburetor body 10 and a closed vacuum chamber 98 is mounted upon the outer end of valve body 96. As best seen in FIG. 4, the interior of chamber 94 is divided into two parts by a diaphragm 100 which is normally spring biased to the left as viewed in FIG. 4 by means of a compression spring 102. The chamber at the right-hand side of diaphragm 100 is connected by a fitting 104 to the manifold of the engine, and thus a vacuum variable with the load on the engine is applied to the right hand interior portion of chamber 98, tending to pull the diaphragm to the right against the action of spring 102.

A valve stem 106 is fixedly mounted upon and movable with diaphragm 100 and carries a needle valve member 108 which is slidably mounted in a bore 110 in valve body 96. The needle 112 of the valve operates within a reduced diameter portion 114 of a central passage 116 through valve body 96, this passage communicating with passage 90 via radial ports 118 through the valve body. Passage 116 in turn communicates at its left-hand end, as viewed in FIG. 4, with a passage 120 in nozzle 26, passage 120 in turn communicating with the orifice 122 of the nozzle.

The spring force of spring 102 is related to the manifold vacuum so that the needle 112 is stationary through the range of normally encountered vacuums. When the manifold vacuum falls to approximately three to four inches of water, a sufficient vacuum exists to shift diaphragm 100 to the right as viewed in FIG. 4, thus increasing the opening of restrictor valve 94 to increase the rate of supply of fuel under high engine load conditions.

In addition to passage 34, a second outlet passage from fuel inlet chamber 32 is provided adjacent the upper end of the chamber as at 130. Outlet passage 130 serves to conduct both liquid and vaporous gas to the interior of a float chamber 132, flow of gas and vapor through passage 130 being under the control of a suitable float control valve assembly designated generally 134, the inlet of passage 130 to chamber 132 being located at 136. Float control valve assembly 134 is of more or less conventional construction.

An outlet passage 138 is connected to the lower portion of float chamber 132 and is continued as by bores 140, 142 and 144 to communicate with a passage 146 through butterfly valve housing 20 and via a passage 148, to communicate with two idle ports 150 located respectively in the outlet passages 18 (FIG. 4) at the outlet side or below butterfly valves 22. Passage 142 communicates with an air passage 152 which opens into the carburetor throat as at 154 (FIG. 4). An idle fuel adjustment screw 156 having a needle point intersecting passage 146 is provided to adjust the normal idle of the engine.

A thermostatically controlled cam 158 is rotatably mounted on the butterfly valve housing 20, as best seen in FIG. 3. Cam 158 is rotatably positioned by a link such as 160 connected to the thermostat of the engine to provide a fast idle adjustment which is transmitted to butterfly valve operating shaft 124 through a fast idle adjustment screw 162 threaded into a crank arm 164 fixedly mounted upon butterfly valve shaft 24. The cold enrichment adjustment shaft 82 of main metering valve 38 may likewise be positioned by a suitable operating linkage coupled to link 160—see for example my co-pending application Ser. No. 636,356.

Having thus described my invention, I claim:

1 In a carburetor including a housing having a throat, throttle controlled butterfly valve means in said throat at the outlet thereof, and a fuel nozzle for introducing fuel into said throat; the improvement comprising inlet means on said housing for receiving fuel from a fuel supply, first metering valve means in said housing for controlling the flow of fuel from said inlet means to said nozzle means, said first valve means comprising a valve seat member having a bore therethrough defining a fuel passage, a valve member mounted for axial reciprocation within said passage, said valve member having a shoulder thereon engageable with said seat at the inlet end of said passage to block said passage and an elongate tapered pin projecting axially from said shoulder through said passage whereby the area of said passage available to the flow of fuel when said shoulder is disengaged from said seat is variable in accordance with the axial position of said pin relative to said passage, means coupling said valve member to said butterfly valve means for positioning said pin axially within said passage in accordance with the position of said butterfly valve means, said means independent of said butterfly valve means for establishing the axial position of said pin relative to said passage means defining a vertically elongate inlet chamber in said housing, first outlet passage means in said housing for conducting fuel from the lower portion of said inlet chamber to said first metering valve means, means in said housing defining a float chamber, second outlet passage means in said housing for conducting fuel from the upper portion of said inlet chamber to said float chamber, and third passage means in said housing for conducting fuel from the lower portion of said float chamber to said throat at a location at the outlet side of said butterfly valve means.

* * * * *